(12) United States Patent
Weaver et al.

(10) Patent No.: US 10,436,118 B2
(45) Date of Patent: Oct. 8, 2019

(54) ACOUSTIC PANEL WITH FOLDING CHAMBER

(71) Applicant: Rohr, Inc., Chula Vista, CA (US)

(72) Inventors: Luby Weaver, Redlands, CA (US);
Charles M. Biset, San Diego, CA (US);
Jeffrey Woods, Beaumont, CA (US);
David M. Adams, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 283 days.

(21) Appl. No.: 15/626,913

(22) Filed: Jun. 19, 2017

(65) Prior Publication Data

US 2018/0363558 A1 Dec. 20, 2018

(51) Int. Cl.
*F02C 7/24* (2006.01)
*F02C 7/045* (2006.01)
(Continued)

(52) U.S. Cl.
CPC .............. *F02C 7/24* (2013.01); *E04B 1/8409* (2013.01); *F02C 7/045* (2013.01); *F02K 1/827* (2013.01); *G10K 11/168* (2013.01); *G10K 11/172* (2013.01); *B64D 2033/0206* (2013.01); *E04B 1/86* (2013.01); *E04B 2001/8471* (2013.01); *F05D 2260/96* (2013.01)

(58) Field of Classification Search
CPC . F02C 7/24; F02C 7/045; F02K 1/827; B64D 2033/0206; E04B 1/8409; E04B 2001/8471; G10K 11/168; G10K 11/172
USPC .......................... 181/284, 286, 290, 292, 294
See application file for complete search history.

(56) References Cited

U.S. PATENT DOCUMENTS 3,341,395 A * 9/1967 Weber .................. E04C 2/3405
428/134
3,542,152 A * 11/1970 Oxx, Jr. ................. B64D 33/02
181/214
(Continued)

FOREIGN PATENT DOCUMENTS

DE 102012001571 A1 8/2013
EP 0888606 11/2011
GB 1406844 A 9/1975

OTHER PUBLICATIONS

European Search Report dated Nov. 29, 2018 for EP Application No. 18178546.0.

*Primary Examiner* — Jeremy A Luks
(74) *Attorney, Agent, or Firm* — O'Shea Getz P.C.

(57) ABSTRACT

A panel is provided for attenuating noise. This panel includes a perforated first skin, a second skin, an array of corrugations, a first channel, a second channel, a plurality of first sidewalls and a plurality of second sidewalls. The array of corrugations includes a first corrugation and a second corrugation. Each of the corrugations includes a baffle and a septum. The first channel is formed by the baffle of the first corrugation, the septum of the first corrugation and the first skin. The second channel is formed by the baffle of the second corrugation, the septum of the first corrugation and the second skin. The first sidewalls divide the first channel into a plurality of first chambers. The second sidewalls divide the second channel into a plurality of second chambers. A first of the second chambers is fluidly coupled with a subset of the first chambers through perforations in the septum of the first corrugation.

20 Claims, 8 Drawing Sheets

(51) Int. Cl.
*F02K 1/82* (2006.01)
*G10K 11/172* (2006.01)
*E04B 1/84* (2006.01)
*G10K 11/168* (2006.01)
*B64D 33/02* (2006.01)
*E04B 1/86* (2006.01)

(56) References Cited

U.S. PATENT DOCUMENTS

| | | | |
|---|---|---|---|
| 3,734,234 A | 5/1973 | Wirt | |
| 3,848,697 A * | 11/1974 | Jannot | F02K 1/827 |
| | | | 181/220 |
| 3,913,702 A | 10/1975 | Wirt et al. | |
| 4,106,587 A | 8/1978 | Nash et al. | |
| 4,122,672 A | 10/1978 | Lowrie | |
| 4,421,201 A | 12/1983 | Nelsen et al. | |
| 4,531,362 A | 7/1985 | Barry et al. | |
| 4,645,032 A | 2/1987 | Ross et al. | |
| 5,028,474 A * | 7/1991 | Czaplicki | B31D 3/005 |
| | | | 428/178 |
| 5,057,176 A * | 10/1991 | Bainbridge | B31F 1/0009 |
| | | | 156/222 |
| 5,618,363 A | 4/1997 | Mullender et al. | |
| 5,785,919 A | 7/1998 | Wilson | |
| 6,122,892 A | 9/2000 | Gonidec et al. | |
| 7,337,875 B2 | 3/2008 | Proscia et al. | |
| 7,401,682 B2 | 7/2008 | Proscia et al. | |
| 7,814,658 B2 * | 10/2010 | Akishev | B21D 47/00 |
| | | | 29/897.32 |
| 7,857,093 B2 | 12/2010 | Sternberger et al. | |
| 7,870,929 B2 | 1/2011 | Farstad | |
| 8,336,316 B2 * | 12/2012 | Kirby | F01D 17/105 |
| | | | 60/785 |
| 8,490,744 B2 | 7/2013 | Nakamura et al. | |
| 8,567,558 B2 | 10/2013 | Nakajima et al. | |
| 8,727,707 B2 | 5/2014 | Schwaller | |
| 8,733,496 B2 | 5/2014 | Ono et al. | |
| 8,833,515 B2 * | 9/2014 | Todorovic | F01D 25/30 |
| | | | 181/213 |
| 8,931,588 B2 | 1/2015 | Murray | |
| 8,955,643 B2 * | 2/2015 | Liu | F02C 7/045 |
| | | | 181/213 |
| 9,097,179 B2 | 8/2015 | Brooks et al. | |
| 9,284,727 B2 | 3/2016 | McKnight et al. | |
| 10,125,688 B2 * | 11/2018 | Loewenstein | B64D 33/06 |
| 2003/0098200 A1 | 5/2003 | Clark | |
| 2005/0263346 A1 * | 12/2005 | Nishimura | E04B 1/86 |
| | | | 181/290 |
| 2006/0169533 A1 | 8/2006 | Patrick | |
| 2011/0100747 A1 * | 5/2011 | Hoetzeldt | G10K 11/16 |
| | | | 181/290 |
| 2012/0160933 A1 | 6/2012 | Vauchel et al. | |
| 2013/0142624 A1 | 6/2013 | Julliard et al. | |
| 2014/0064928 A1 | 3/2014 | Todorovic et al. | |
| 2014/0326536 A1 | 11/2014 | Vauchel et al. | |
| 2015/0037135 A1 | 2/2015 | Kempton | |
| 2015/0367953 A1 | 12/2015 | Yu et al. | |
| 2016/0076453 A1 | 3/2016 | Richter | |

\* cited by examiner

ACOUSTIC PANEL WITH FOLDING CHAMBER

BACKGROUND

1. Technical Field

This disclosure relates generally to noise attenuation and, more particularly, to an acoustic panel for attenuating noise generated by, for example, a gas turbine engine for an aircraft propulsion system.

2. Background Information

A propulsion system for an aircraft produces varying amounts of audible noise during operation. One or more acoustic panels may be configured with the propulsion system to attenuate and reduce this noise. As a general rule with known technology, relatively thin acoustic panels are utilized to attenuate noise with relatively short wavelengths and high frequencies, whereas relatively thick acoustic panels are utilized to attenuate noise with relatively long wavelengths. However, as noise wavelengths lengthen as a byproduct of new engine designs while space allocation for sound attenuation structures decreases, traditional acoustic panel configurations may not fulfill all their requirements. There is a need in the art for an improved sound attenuation structure for an aircraft propulsion system that attenuates longer wavelength, low frequency noise without being excessively thick.

SUMMARY OF THE DISCLOSURE

According to an aspect of the present disclosure, a panel is provided for attenuating noise. This panel includes a perforated first skin, a second skin, an array of corrugations, a first channel, a second channel, a plurality of first sidewalls and a plurality of second sidewalls. The array of corrugations includes a first corrugation and a second corrugation. Each of the corrugations includes a baffle and a septum. The first channel is formed by the baffle of the first corrugation, the septum of the first corrugation and the first skin. The second channel is formed by the baffle of the second corrugation, the septum of the first corrugation and the second skin. The first sidewalls divide the first channel into a plurality of first chambers. The second sidewalls divide the second channel into a plurality of second chambers. A first of the second chambers is fluidly coupled with a subset of the first chambers through perforations in the septum of the first corrugation.

According to another aspect of the present disclosure, another panel is provided for attenuating noise. This panel includes a perforated first skin, a second skin, an array of corrugations, a first channel, a second channel, a plurality of first sidewalls and a plurality of second sidewalls. The array of corrugations include a first corrugation and a second corrugation. Each of the corrugations includes a baffle and a septum. The first channel is formed by the baffle of the first corrugation, the septum of the first corrugation and the first skin. The second channel is formed by the baffle of the second corrugation, the septum of the first corrugation and the second skin. The first sidewalls divide the first channel into a plurality of first chambers. An adjacent pair of the first sidewalls are longitudinally separated by a first distance. The second sidewalls divide the second channel into a plurality of second chambers. An adjacent pair of the second sidewalls are longitudinally separated by a second distance that is greater than the first distance.

According to still another aspect of the present disclosure, another panel is provided for attenuating noise. This panel includes a perforated first skin, a second skin, a core, a first channel and a second channel. The core is between the first skin and the second skin. The core includes a first baffle, a second baffle, a porous first septum, a plurality of first sidewalls and a plurality of second sidewalls. The first channel is formed by the first baffle, the first septum and the first skin. The second channel is formed by the second baffle, the first septum and the second skin. The first sidewalls divides the first channel into a plurality of first chambers. The second sidewalls divides the second channel into a plurality of second chambers. A first of the second chambers is fluidly coupled with a subset of the first chambers through the first septum.

An adjacent pair of the first sidewalls may be longitudinally separated by a first distance. An adjacent pair of the second sidewalls may be longitudinally separated by a second distance that is greater than the first distance.

The second distance may be N times greater than the first distance, where N may be a whole number equal to or greater than two.

The first channel and the second channel may extend longitudinally along the first corrugation. A first of the second sidewalls may be longitudinally aligned with a respective one of the first sidewalls.

The first channel and the second channel may extend longitudinally along the first corrugation. A first of the second sidewalls may be longitudinally offset from each of the first sidewalls.

A first end of the baffle of the first corrugation may be connected to the second skin. A second end of the baffle of the first corrugation may be connected to the first skin and a first end of the septum of the first corrugation. A second end of the septum of the first corrugation may be connected to the second skin.

The baffle of the first corrugation and the septum of the first corrugation may each extend between the first skin and the second skin. The baffle of the first corrugation may be angularly offset from each of the first skin and the second skin by an acute angle. The septum the first corrugation may be angularly offset from each of the first skin and the second skin by an acute angle.

The baffle of the first corrugation and the septum of the first corrugation may each extend between the first skin and the second skin. The baffle of the first corrugation may be angularly offset from each of the first skin and the second skin by an acute angle. The septum the first corrugation may be substantially perpendicular to the first skin and the second skin.

A first of the first chambers may extend vertically from the first corrugation to the first skin, may extend laterally between the baffle of the first corrugation and the septum of the first corrugation, and may extend longitudinally between an adjacent pair of the first sidewalls.

The first of the second chambers may extend vertically from the first and the second corrugations to the second skin, may extend laterally between the baffle of the second corrugation and the septum of the first corrugation, and may extend longitudinally between an adjacent pair of the second sidewalls.

The first of the second chambers and the subset of the first chambers may each be configured as an empty space.

The panel may include a core connected between the first skin and the second skin. The core may include the array of corrugations, the first sidewalls and the second sidewalls. The core may be configured from or otherwise include fiber-reinforced composite material.

The panel may include a core connected between the first skin and the second skin. The core may include the array of corrugations, the first sidewalls and the second sidewalls. The core may be configured from or otherwise include sheet metal.

The panel may include a plurality of third sidewalls and a plurality of fourth sidewalls. The array of corrugations may include a third corrugation. A third channel may be formed by the baffle of the second corrugation, the septum of the second corrugation and the first skin. A fourth channel may be formed by the baffle of the third corrugation, the septum of the second corrugation and the second skin. The third sidewalls may divide the third channel into a plurality of third chambers. The fourth sidewalls may divide the fourth channel into a plurality of fourth chambers. A first of the third chambers may be fluidly coupled with a subset of the fourth chambers through perforations in the septum of the second corrugation.

The panel may be configured as a component of a nacelle for an aircraft propulsion system.

A first of the second chambers may be fluidly coupled with a subset of the first chambers through perforations in the septum of the first corrugation.

Each of the second chambers may only be fluidly coupled with a respective one of the first chambers.

The foregoing features and the operation of the invention will become more apparent in light of the following description and the accompanying drawings.

DETAILED DESCRIPTION

Figure 1:
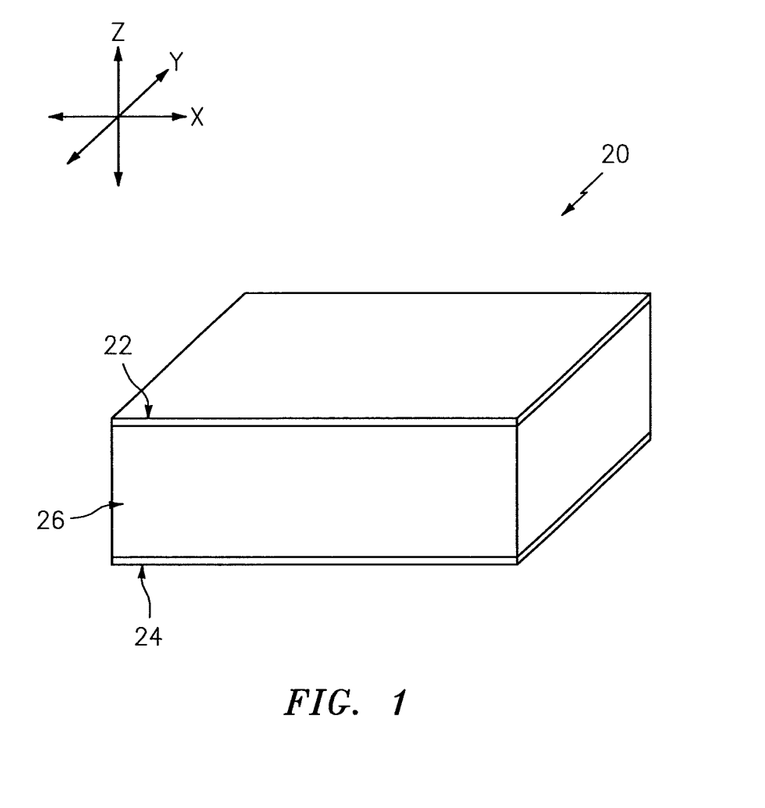
FIG. 1 is a partial perspective block diagram illustration of an acoustic panel.

FIG. 1 is a partial perspective block diagram illustration of a structural and acoustic panel 20 for attenuating noise. This acoustic panel 20 may be configured to attenuate noise generated by an aircraft propulsion system such as, for example, a turbofan propulsion system or a turbojet propulsion system. With such a configuration, the acoustic panel 20 may be configured with a nacelle of the propulsion system. The acoustic panel 20, for example, may be configured as or with an inner or outer barrel, a translating sleeve of a thrust reverser, a blocker door, etc. Alternatively, the acoustic panel 20 may be configured with another component/structure of the aircraft such as its fuselage or a wing. Furthermore, the acoustic panel 20 may be configured to also or alternatively attenuate aircraft related noise other than that generated by the propulsion system. The acoustic panel 20 of the present disclosure, however, may alternatively be configured for non-aircraft applications.

Figure 2:
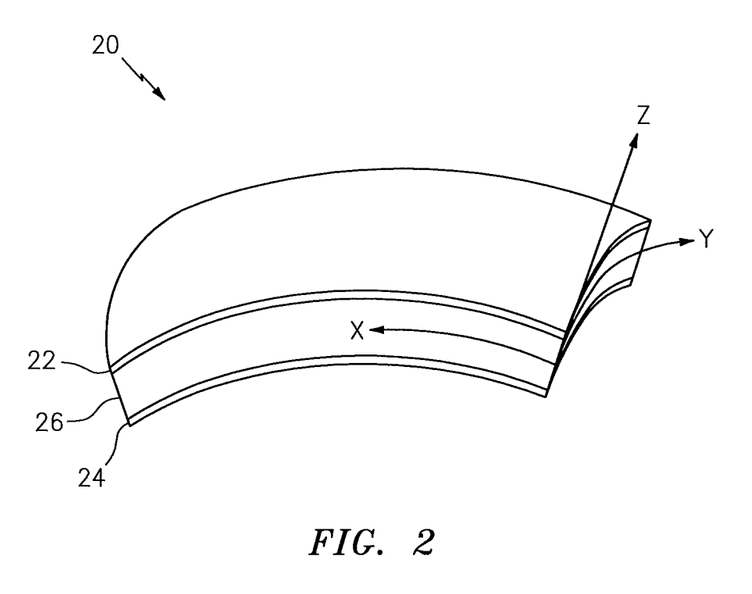
FIG. 2 is a partial perspective block diagram illustration of another acoustic panel.

The acoustic panel 20 extends laterally along an x-axis. The acoustic panel 20 extends longitudinally along a y-axis. The acoustic panel 20 extends vertically along a z-axis. The term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 20 may be curved and/or follow an undulating geometry. For example, the x-y plane and, thus, the acoustic panel 20 may be arcuate, cylindrical or conical with or without radial undulations. Thus, the vertical direction may change at different locations along the x-y plane. For example, referring to FIG. 2, the vertical direction may be a radial direction for a cylindrical or conical acoustic panel.

Referring again to FIG. 1, the acoustic panel 20 includes a perforated first (e.g., face) skin 22, a non-perforated second (e.g., back) skin 24 and a cellular core 26. Briefly, the core 26 is disposed and extends vertically between the first skin 22 and the second skin 24. The core 26 is also connected to the first skin 22 and the second skin 24. The core 26, for example, may be welded, brazed, fused, adhered and/or otherwise bonded to the first skin 22 and/or the second skin 24. The core 26 may also or alternatively be mechanically fastened to the first skin 22 and/or the second skin 24. Alternatively, the core 26 may be formed integral with the first skin 22 and/or the second skin 24 as a monolithic body using, for example, additive manufacturing or through a composite layup process. However, the present disclosure is not limited to any particular manufacturing methods.

Figure 3:
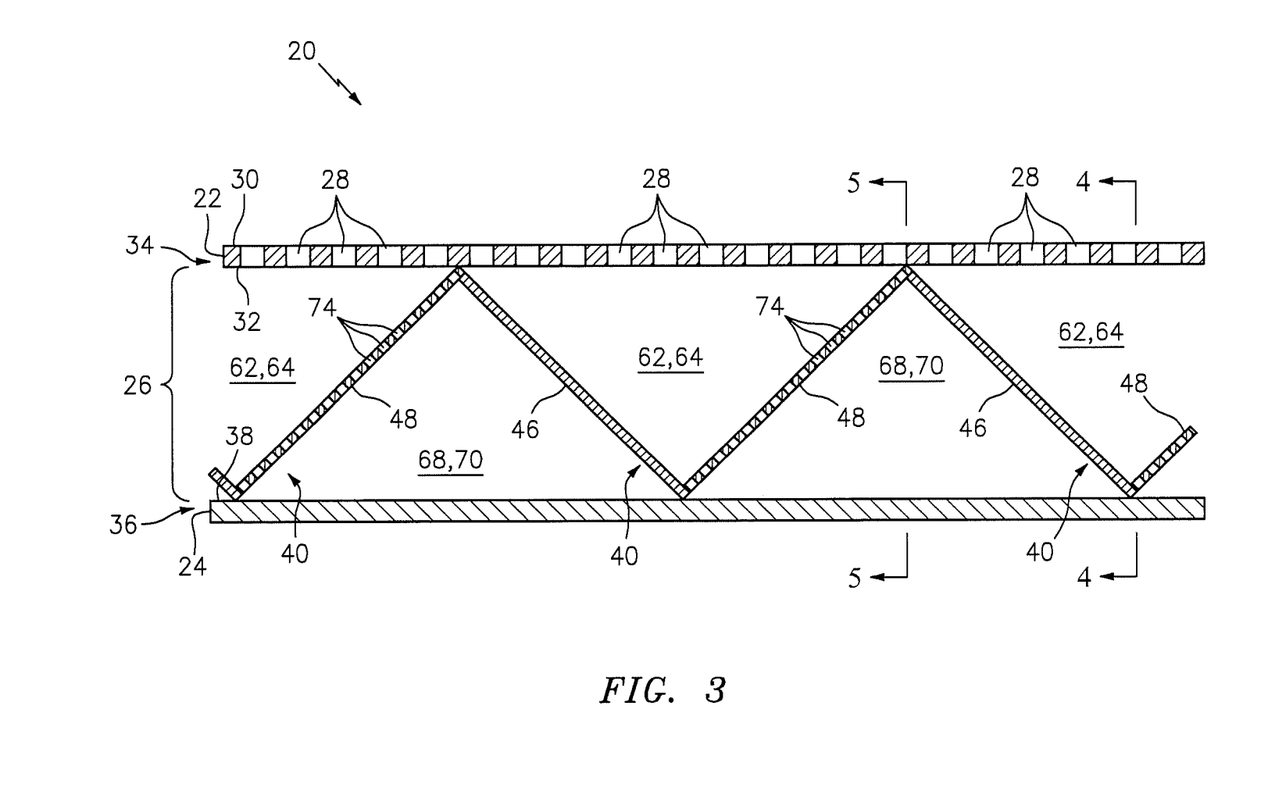
FIG. 3 is a partial side sectional illustration of an acoustic panel.

The first skin 22 may be configured as a relatively thin sheet or layer of material that extends laterally and longitudinally along the x-y plane. This first skin material may include, but is not limited to, a metal, a polymer, a fiber reinforced composite (e.g., fiberglass composite, carbon fiber composite, aramid fiber composite, etc.), or a combination thereof. Referring now to FIG. 3, the first skin 22 includes a plurality of perforations 28, which may be apertures such as through-holes. Each of the perforations 28 extends generally vertically through the first skin 22 between opposing side surfaces 30 and 32 of the first skin 22.

The second skin 24 may be configured as a relatively thin sheet or layer of (e.g., continuous and uninterrupted/non-perforated) material that extends laterally and longitudinally along the x-y plane (see FIG. 1). This second skin material may include, but is not limited to, a metal, a polymer, a fiber reinforced composite (e.g., fiberglass composite, carbon fiber composite, aramid fiber composite, etc.), or a combination thereof. The second skin material may be the same as or different than the first skin material.

The core 26 extends laterally and longitudinally along the x-y plane (see FIG. 1). The core 26 extends vertically between opposing core sides 34 and 36. The first core side 34 is abutted (e.g., directly) against the first skin 22 and its side surface 32. The second core side 36 is abutted (e.g., directly) against the second skin 24 and its side surface 38.

Referring to FIGS. 4-7, the core 26 includes an array of corrugations 40, one or more sets of first sidewalls 42 and one or more sets of second sidewalls 44. Each of the corrugations 40 includes a non-perforated baffle 46 and a porous/perforated septum 48.

Figure 8:
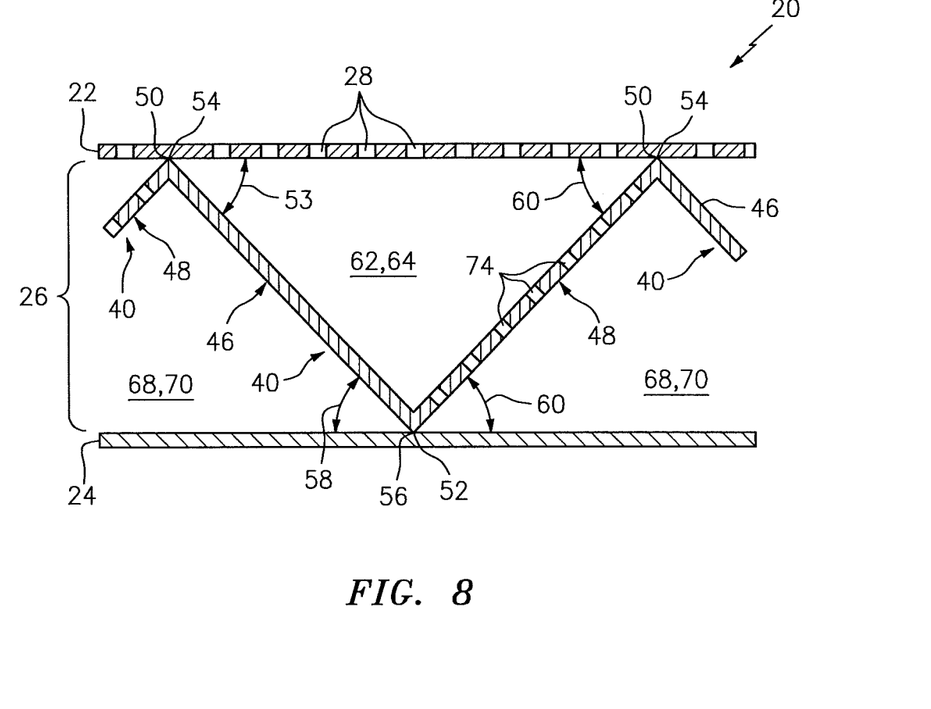
FIG. 8 is an enlarged side sectional illustration of a portion of the acoustic panel of FIG. 3.

Referring now to FIG. 8, each baffle 46 may be configured as a relatively thin sheet or layer of (e.g., continuous and uninterrupted/non-perforated) material. Each baffle 46 extends vertically and laterally between a top baffle end 50 (e.g., edge) and an opposing bottom baffle end 52 (e.g., edge). Note, the terms "top" and "bottom" are used above to describe ends of the baffle 46 as situated in the drawings and are not intended to limit the baffle 46 or the acoustic panel 20 to such an exemplary gravitational orientation.

The top baffle end 50 is connected to or otherwise engaged with the first skin 22. The top baffle end 50 of FIG. 8 is also connected to a top septum end 54 of the septum 48 in an adjacent corrugation 40. The bottom baffle end 52 is connected to or otherwise engaged with the second skin 24. The bottom baffle end 52 is also connected to a bottom septum end 56 of the septum 48 in the same corrugation 40. With the foregoing configuration, the baffle 46 of FIG. 8 is angularly offset from each the first skin 22 and the second skin 24 by an acute angle 58. This acute angle 58 may be between thirty and sixty degrees (e.g., forty-five degrees); however, the present disclosure is not limited to the foregoing exemplary values.

Each septum 48 may be configured from a relatively thin sheet or layer of porous (e.g., perforated) material. Each septum 48 extends vertically and laterally between the top septum end 54 (e.g., edge) and the opposing bottom septum end 56 (e.g., edge). Note, the terms "top" and "bottom" are used above to describe ends of the septum 48 as situated in the drawings and are not intended to limit the septum 48 or the acoustic panel 20 to such an exemplary gravitational orientation.

Figure 9:
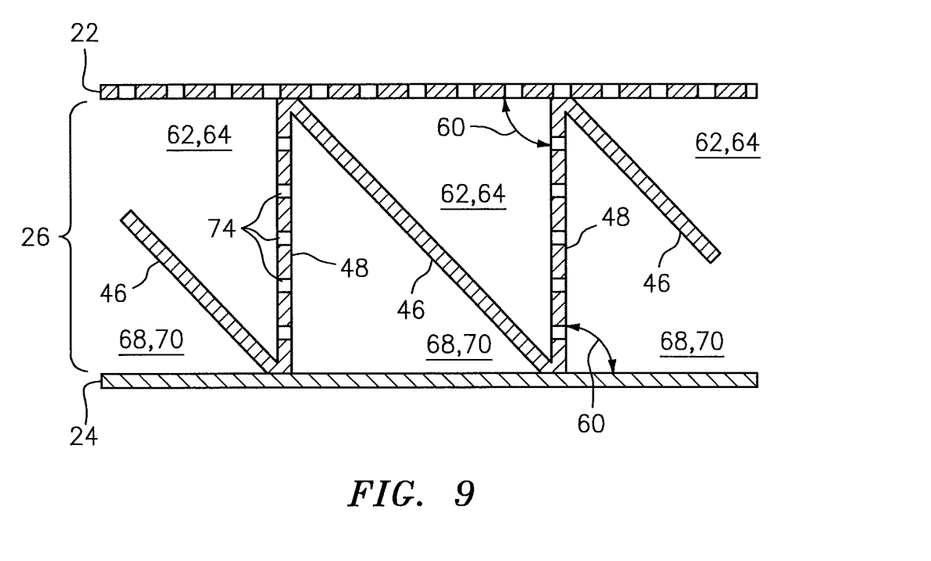
FIG. 9 is a partial side sectional illustration of another acoustic panel.
Figure 10:
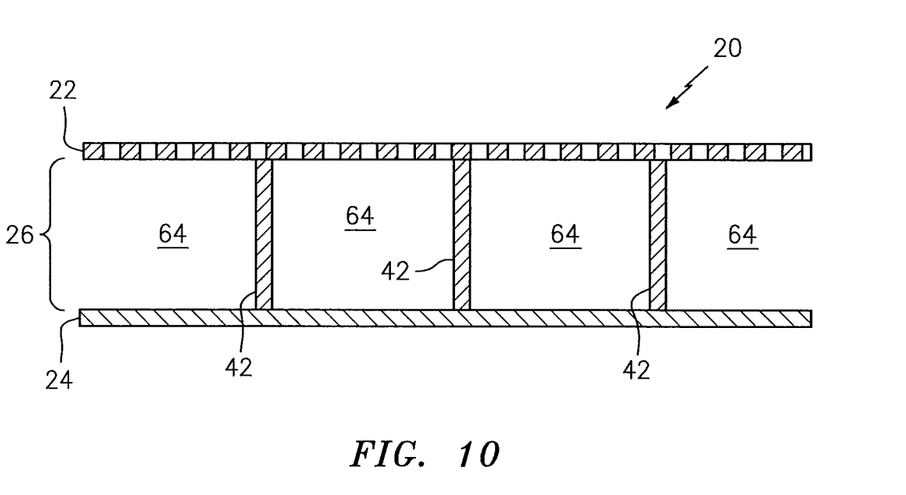
FIG. 10 is a partial cross-sectional illustration of another acoustic panel showing first sidewalls.
Figure 11:
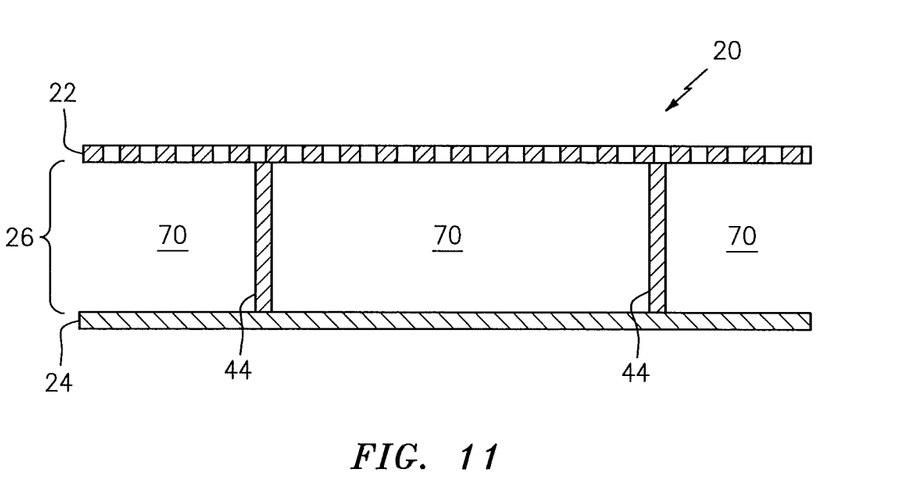
FIG. 11 is a partial cross-sectional illustration of the acoustic panel of FIG. 10 showing second sidewalls.
Figure 12:
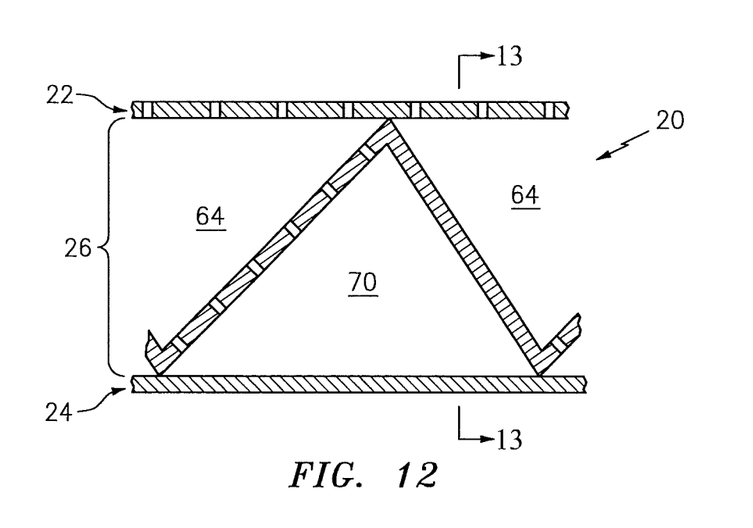
FIG. 12 is a partial side sectional illustration of another acoustic panel.
Figure 13:
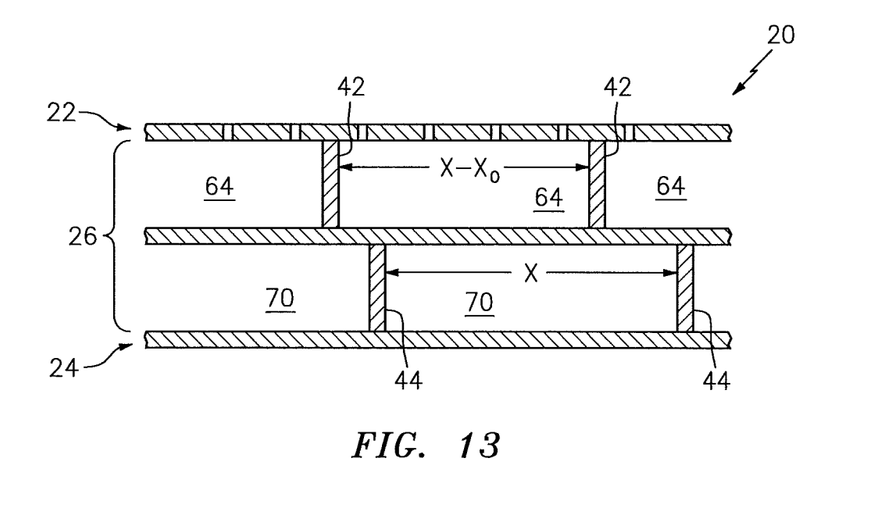
FIG. 13 is a partial cross-sectional illustration of the acoustic panel of FIG. 12 showing first and second sidewalls.

The top septum end 54 is connected to or otherwise engaged with the first skin 22. The bottom septum end 56 is connected to or otherwise engaged with the second skin 24. With the foregoing configuration, the septum 48 of FIG. 8 is angularly offset from each the first skin 22 and the second skin 24 by an acute angle 60, which may be the same as or different than the acute angle 58. The acute angle 60 may be between thirty and sixty degrees (e.g., forty-five degrees); however, the present disclosure is not limited to the foregoing exemplary values. Furthermore, in other embodiments, the angle 60 between the septum 48 and each of the first skin 22 and the second skin 24 may be a right angle as shown in FIG. 9.

Figure 6:
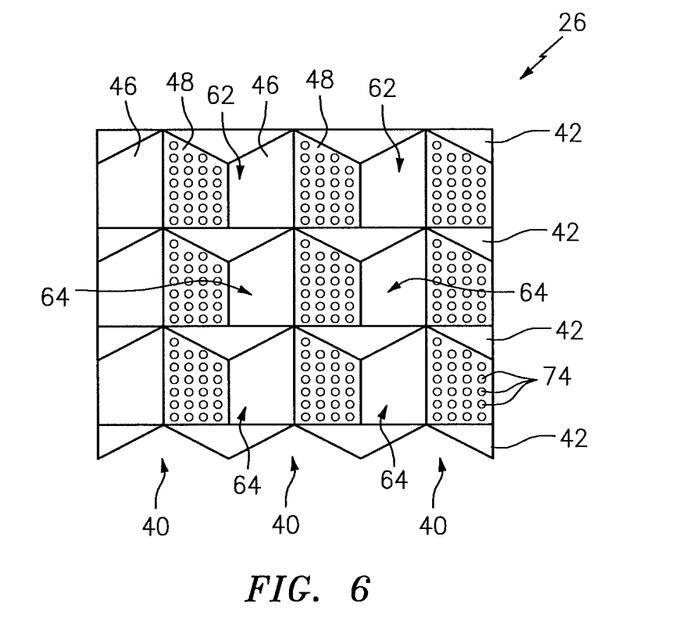
FIG. 6 is a partial perspective illustration of a first side of a cellular core of FIG. 6.

Referring to FIGS. 6 and 8, each of the corrugations 40 forms a respective first channel 62 with the first skin 22. This first channel 62 extends longitudinally along a length of the respective corrugation 40. The first channel 62 extends vertically from the first skin 22 to the baffle 46 and the septum 48 of the respective corrugation 40. The first channel 62 extends laterally between the baffle 46 and the septum 48 of the respective corrugation 40.

Each set of the first sidewalls 42 includes a plurality of the first sidewalls 42. Each set of the first sidewalls 42 is arranged with a respective one of the corrugations 40. More particularly, the first sidewalls 42 in each set is arranged within a respective one of the first channels 62 in a longitudinally extending array. These first sidewalls 42 are configured within the respective first channel 62 to (e.g., fluidly) divide that first channel 62 into a plurality of first chambers 64. For example, each first sidewall 42 extends vertically from the first skin 22 to the baffle 46 and the septum 48 of a respective corrugation 40. Each first sidewall 42 extends laterally between the baffle 46 and the septum 48 of a respective corrugation 40. Each first sidewall 42 is also longitudinally separated from each longitudinally adjacent first sidewall 42 in the same channel 62 by a longitudinal distance 66.

With the foregoing sidewall 42 configuration, each of the first chambers 64 extends vertically from the first skin 22 to the baffle 46 and the septum 48 of a respective corrugation 40. Each first chamber 64 extends laterally between the baffle 46 and the septum 48 of a respective corrugation 40. Each first chamber 64 extends longitudinally between a longitudinally adjacent pair of the first sidewalls 42, such that each first chamber 64 has a longitudinal length that is the same as the longitudinal distance 66 between the adjacent first sidewalls 42.

Each of the first chambers 64 is fluidly coupled to the environment outside of the panel 20 and adjacent the first skin 22 through one or more of the perforations 28 in the first skin 22. Each first chamber 64 may be configured as an empty space. In other words, the acoustic panel 20 may be configured without including any other elements within each first chambers 64. Of course, the present disclosure is not limited to such an empty configuration.

Figure 7:
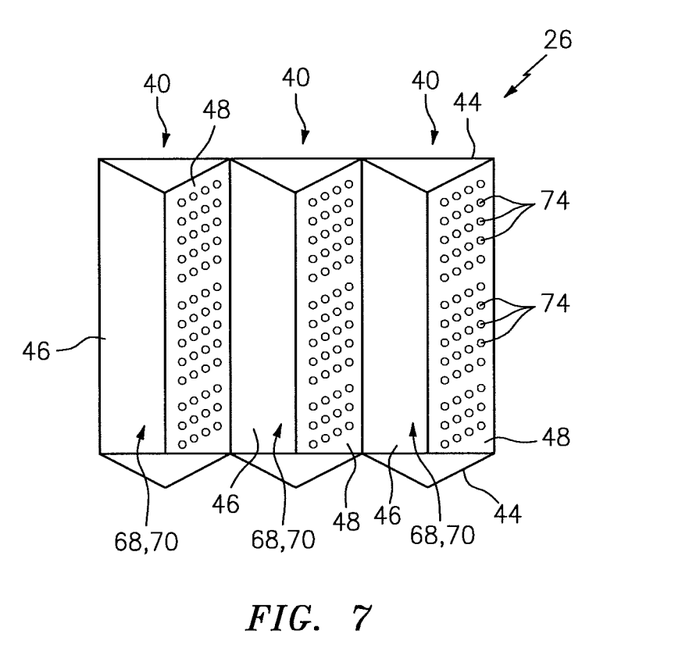
FIG. 7 is a partial perspective illustration of a second side of the cellular core.

Referring to FIGS. 7 and 8, each laterally adjacent pair of corrugations 40 forms a respective second channel 68 with the second skin 24. This second channel 68 extends longitudinally along lengths of the respective adjacent corrugations 40. The second channel 68 extends vertically from the second skin 24 to the baffle 46 of one of the respective corrugations 40 and the septum 48 of the other one of the respective corrugations 40. The second channel 68 extends laterally between the baffle 46 of one of the respective corrugations 40 and the septum 48 of the other one of the respective corrugations 40.

Each set of the second sidewalls 44 includes a plurality of the second sidewalls 44. Each set of the second sidewalls 44 is arranged between a respective adjacent pair of the corrugations 40. More particularly, the second sidewalls 44 in each set is arranged within a respective one of the second channels 68 in a longitudinally extending array. These second sidewalls 44 are configured within the respective second channel 68 to (e.g., fluidly) divide that second channel 68 into a plurality of second chambers 70; e.g., folding chambers. For example, each second sidewall 44 extends vertically from the second skin 24 to the baffle 46 of one of the respective corrugations 40 and the septum 48 of the other one of the respective corrugations 40. Each second sidewall 44 extends laterally between the baffle 46 of one of the respective corrugations 40 and the septum 48 of the other one of the respective corrugations 40. Each second sidewall 44 is also longitudinally separated from longitudinally adjacent second sidewalls 44 in the same channel by a longitudinal distance 72.

With the foregoing sidewall 44 configuration, each of the second chambers 70 extends vertically from the second skin 24 to the baffle 46 of one of the respective corrugations 40 and the septum 48 of the other one of the respective corrugations 40. Each second chamber 70 extends laterally between the baffle 46 of one of the respective corrugations 40 and the septum 48 of the other one of the respective corrugations 40. Each second chamber 70 extends longitudinally between a longitudinally adjacent pair of the second sidewalls 44, such that each second chamber 70 has a longitudinal length that is the same as the longitudinal distance 72 between the adjacent second sidewalls 44.

Figure 4:
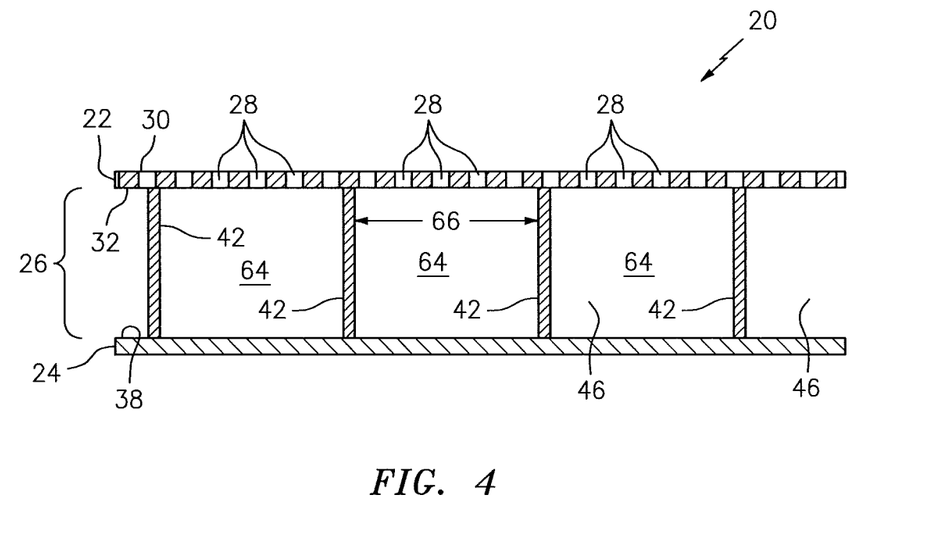
FIG. 4 is a partial cross-sectional illustration of the acoustic panel of FIG. 3 at line 4-4.
Figure 5:
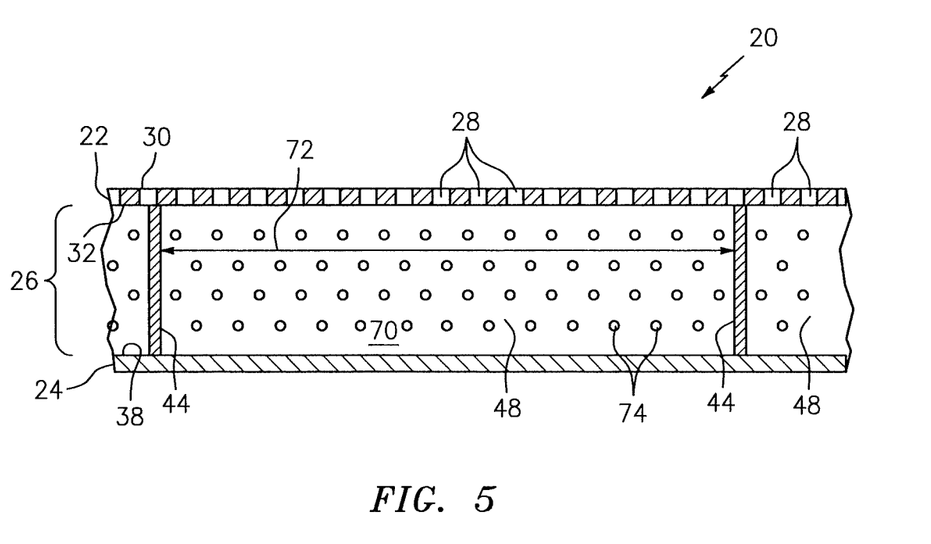
FIG. 5 is a partial cross-sectional illustration of the acoustic panel of FIG. 3 at line 5-5.

Referring to FIGS. 4 and 5, the longitudinal distance 72 is greater than the longitudinal distance 66. For example, the longitudinal distance 72 may be N times greater than the longitudinal distance 66, where N is a whole number greater than or equal to two. The longitudinal distance 72 of FIG. 7, for example, is about three times longer than the longitudinal distance 66 of FIG. 6. In this manner, each second chamber 70 may be aligned with a plurality of the first chambers 64, here three of the first chambers 64. Thus, perforations 74 in the septum 48 fluidly couple each second chamber 70 to a plurality of the first chambers 64. However, each of the first chambers 64 is typically only fluidly coupled with one of the second chambers 70.

The second chamber 70 and the first chambers 64 fluidly coupled therewith collectively form a resonance chamber system. This resonance chamber system is operable of attenuating multiple frequencies of noise; e.g., relatively high frequency noise and relatively low frequency noise. For example, each first chamber 64 may receive relatively high frequency sound waves through the perforations 28 in the first skin 22. The first chamber 64 may reverse the phase of one or more frequencies of those sound waves using known acoustic reflection principles and subsequently direct the reverse phase sound waves out of the acoustic panel 20 through the perforations 28 to destructively interfere with other incoming noise waves. By contrast, relatively low frequency sound waves may travel into the second chamber 70, and may travel longitudinally through the chamber 70. The second chamber 70 may reverse the phase of one or more frequencies of those sound waves using known acoustic reflection principles and subsequently direct the reverse phase sound waves out of the acoustic panel 20 through first chambers 64 and the perforations 28 to destructively interfere with other incoming noise waves.

It is also worth noting, the acoustic length of the resonance chamber system is longer than a vertical thickness of the core 26. This enables the acoustic panel 20 to attenuate lower frequency sound waves than would be possible with a traditional prior art double degree of freedom (DDoF) acoustic panel.

The core 26 may be constructed from any suitable material(s). The core 26, for example, may be constructed from a metal (e.g., sheet metal), a polymer, a fiber reinforced composite (e.g., fiberglass composite, carbon fiber composite, aramid fiber composite, fiber reinforced plastic (FRP), metal matrix material, using continuous fibers, chopped fiber, particulates infused (e.g., nano tubes, etc.), paper such as that in a nomex core, etc.), or a combination thereof one or more of components of the core 26 may be constructed from the same or a like material. Alternatively, one or more of the components of the core 26 may be constructed from a different material than one or more of the other components of the core 26. Furthermore, the core 26 may be constructed from the same material(s) as the first skin 22 and/or the second skin 24, or a different material or materials.

In some embodiments, as shown by FIGS. 4 and 5, each of the second sidewalls 44 may be longitudinally aligned with a respective one of the first sidewalls 42. However, in other embodiments, each of the second sidewalls 44 may be longitudinally offset from each of the first sidewalls 42 as shown by FIGS. 10 to 13. With such a configuration, adjacent resonance chamber systems may be interconnected with one another.

In some embodiments, referring to FIGS. 4 and 5, one or more of the sidewalls 42, 44 may be each angularly offset from a respective skin 22, 24 by a right (ninety degree) angle. However, in other embodiments, one or more of the sidewalls 42, 44 may be each angularly offset from a respective skin 22, 24 by an acute angle.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A panel for attenuating noise, comprising:
    a perforated first skin;
    a second skin;
    an array of corrugations comprising a first corrugation and a second corrugation, each of the corrugations including a baffle and a septum;
    a first channel formed by the baffle of the first corrugation, the septum of the first corrugation and the first skin;
    a second channel formed by the baffle of the second corrugation, the septum of the first corrugation and the second skin;
    a plurality of first sidewalls dividing the first channel into a plurality of first chambers; and
    a plurality of second sidewalls dividing the second channel into a plurality of second chambers, wherein a first of the second chambers is fluidly coupled with a subset of the first chambers through perforations in the septum of the first corrugation.

2. The panel of claim 1, wherein an adjacent pair of the first sidewalls are longitudinally separated by a first distance, and an adjacent pair of the second sidewalls are longitudinally separated by a second distance that is greater than the first distance.

3. The panel of claim 2, wherein the second distance is N times greater than the first distance, and N is a whole number equal to or greater than two.

4. The panel of claim 1, wherein the first channel and the second channel extend longitudinally along the first corrugation, and a first of the second sidewalls is longitudinally aligned with a respective one of the first sidewalls.

5. The panel of claim 1, wherein the first channel and the second channel extend longitudinally along the first corrugation, and a first of the second sidewalls is longitudinally offset from each of the first sidewalls.

6. The panel of claim 1, wherein
    a first end of the baffle of the first corrugation is connected to the second skin;
    a second end of the baffle of the first corrugation is connected to the first skin and a first end of the septum of the first corrugation; and
    a second end of the septum of the first corrugation is connected to the second skin.

7. The panel of claim 1, wherein
the baffle of the first corrugation and the septum of the first corrugation each extends between the first skin and the second skin;
the baffle of the first corrugation is angularly offset from each of the first skin and the second skin by an acute angle; and
the septum of the first corrugation is angularly offset from each of the first skin and the second skin by an acute angle.

8. The panel of claim 1, wherein
the baffle of the first corrugation and the septum of the first corrugation each extends between the first skin and the second skin;
the baffle of the first corrugation is angularly offset from each of the first skin and the second skin by an acute angle; and
the septum of the first corrugation is substantially perpendicular to the first skin and the second skin.

9. The panel of claim 1, wherein a first of the first chambers extends vertically from the first corrugation to the first skin, extends laterally between the baffle of the first corrugation and the septum of the first corrugation, and extends longitudinally between an adjacent pair of the first sidewalls.

10. The panel of claim 1, wherein the first of the second chambers extends vertically from the first and the second corrugations to the second skin, extends laterally between the baffle of the second corrugation and the septum of the first corrugation, and extends longitudinally between an adjacent pair of the second sidewalls.

11. The panel of claim 1, wherein the first of the second chambers and the subset of the first chambers are each configured as an empty space.

12. The panel of claim 1, further comprising a core connected between the first skin and the second skin, the core including the array of corrugations, the first sidewalls and the second sidewalls, and the core comprising fiber-reinforced composite material.

13. The panel of claim 1, further comprising a core connected between the first skin and the second skin, the core including the array of corrugations, the first sidewalls and the second sidewalls, and the core comprising sheet metal.

14. The panel of claim 1, further comprising a plurality of third sidewalls and a plurality of fourth sidewalls, wherein
the array of corrugations further comprises a third corrugation;
a third channel is formed by the baffle of the second corrugation, the septum of the second corrugation and the first skin;
a fourth channel is formed by the baffle of the third corrugation, the septum of the second corrugation and the second skin;
the third sidewalls divide the third channel into a plurality of third chambers;
the fourth sidewalls divide the fourth channel into a plurality of fourth chambers; and
a first of the third chambers is fluidly coupled with a subset of the fourth chambers through perforations in the septum of the second corrugation.

15. The panel of claim 1, wherein the panel is configured as a component of a nacelle for an aircraft propulsion system.

16. A panel for attenuating noise, comprising:
a perforated first skin;
a second skin;
an array of corrugations comprising a first corrugation and a second corrugation, each of the corrugations including a baffle and a septum;
a first channel formed by the baffle of the first corrugation, the septum of the first corrugation and the first skin;
a second channel formed by the baffle of the second corrugation, the septum of the first corrugation and the second skin;
a plurality of first sidewalls dividing the first channel into a plurality of first chambers, wherein an adjacent pair of the first sidewalls are longitudinally separated by a first distance; and
a plurality of second sidewalls dividing the second channel into a plurality of second chambers, wherein an adjacent pair of the second sidewalls are longitudinally separated by a second distance that is greater than the first distance.

17. The panel of claim 16, wherein the second distance is N times greater than the first distance, and N is a whole number equal to or greater than two.

18. The panel of claim 16, wherein a first of the second chambers is fluidly coupled with a subset of the first chambers through perforations in the septum of the first corrugation.

19. The panel of claim 16, wherein each of the second chambers is only fluidly coupled with a respective one of the first chambers.

20. A panel for attenuating noise, comprising:
a perforated first skin;
a second skin;
a core between the first skin and the second skin, the core including a first baffle, a second baffle, a porous first septum, a plurality of first sidewalls and a plurality of second sidewalls;
a first channel forming by the first baffle, the first septum and the first skin;
a second channel formed by the second baffle, the first septum and the second skin;
the first sidewalls dividing the first channel into a plurality of first chambers; and
the second sidewalls dividing the second channel into a plurality of second chambers;
wherein a first of the second chambers is fluidly coupled with a subset of the first chambers through the first septum.

* * * * *